(12) United States Patent
Merbeth

(10) Patent No.: US 7,690,332 B1
(45) Date of Patent: Apr. 6, 2010

(54) HUMANE WEANING MUZZLE

(76) Inventor: Laura J. Merbeth, N56 W27034 Hwy. K, Sussex, WI (US) 53089

( * ) Notice: Subject to any disclaimer, the term of this patent is extended or adjusted under 35 U.S.C. 154(b) by 0 days.

(21) Appl. No.: 12/245,045

(22) Filed: Oct. 3, 2008

(51) Int. Cl.
*A01K 13/00* (2006.01)
*B68C 5/00* (2006.01)

(52) U.S. Cl. .................... 119/832; 119/827; 54/80.3

(58) Field of Classification Search ............... 119/821, 119/823, 827, 831, 832, 820; 54/80.3, 80.1, 54/80.5
See application file for complete search history.

(56) References Cited

U.S. PATENT DOCUMENTS

| 381,285 | A | * | 4/1888 | Shue ........................ 54/80.3 |
| 547,110 | A | | 10/1895 | Boucher |
| 1,082,372 | A | * | 12/1913 | Thompson .................. 119/831 |
| 1,311,933 | A | * | 8/1919 | Weigel ........................ 54/80.3 |
| 2,672,846 | A | | 3/1954 | Maynard |
| 3,491,755 | A | | 1/1970 | Barghini et al. |
| 3,609,941 | A | * | 10/1971 | Eldredge .................... 54/80.3 |
| 4,044,531 | A | * | 8/1977 | Marchello et al. ............ 54/80.3 |

* cited by examiner

*Primary Examiner*—T. Nguyen
(74) *Attorney, Agent, or Firm*—Donald J. Ersler

(57) ABSTRACT

A humane weaning muzzle includes a snout cover, a snout strap and at least two halter straps. The snout cover preferably includes a matrix of straps and cross straps attached to each other. The adjustment strap is attached to snout cover. Each halter strap includes a strap material. One of a loop and hook fastener are formed on one end of the strap material. One of a hook and loop fastener are formed on substantially a middle of the strap material. The strap material is secured to the snout cover. One end of each halter strap is inserted under a halter and secured to substantially a middle of each halter strap. Each end of the adjustment strap is wrapped under the snout of the foal and secured to each other and tightened. The humane weaning muzzle allows the foal to eat hay, graze off the ground and drink water.

17 Claims, 3 Drawing Sheets

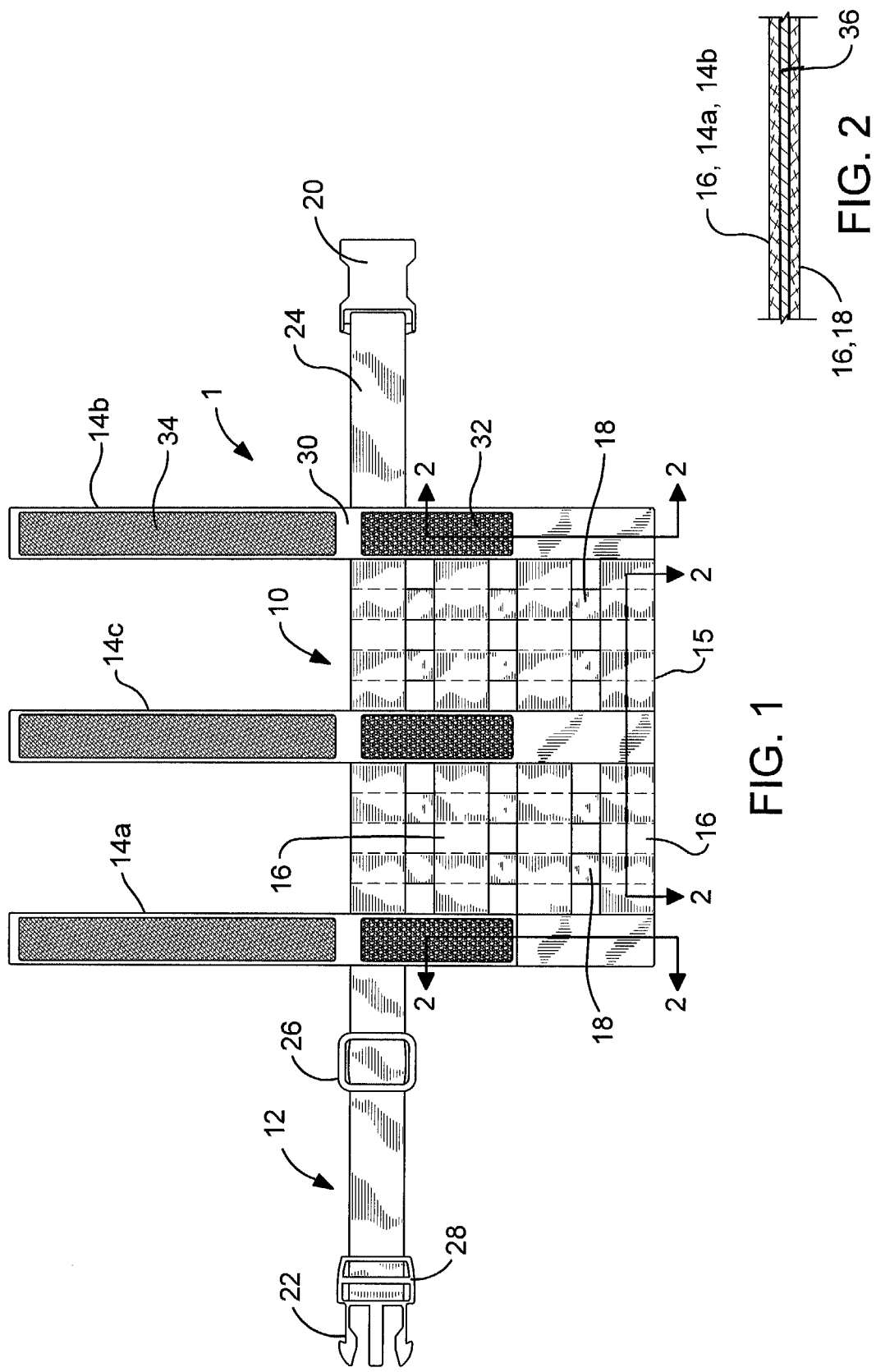

HUMANE WEANING MUZZLE

BACKGROUND OF THE INVENTION

1. Field of the Invention

The present invention relates generally to foals and more specifically to a humane weaning muzzle, which prevents a mare from nursing her foal.

2. Discussion of the Prior Art

One of the most stressful times in a foal's life is when it is being weaned. The foal is separated from its mother and it's milk supply is cut-off. To prevent the foal from nursing, the foal is separated from its mother. The foal will become frantic and call for it's mother. The foal's mother will also call for her foal. However, it appears that no humane device exists for preventing the foal from nursing without separating the foal from its mother.

U.S. Pat. No. 547,110 to Boucher discloses a muzzle. The Boucher patent includes a muzzle that is capable of automatically opening when the head of an animal is lowered in the act of grazing and of similarly closing when the head of an animal is raised. U.S. Pat. No. 2,672,846 to Maynard discloses a calf weaning halter. The Maynard patent includes a calf weaning halter formed with comparatively few straps and having a metal strap with a disc having prongs extended therefrom mounted on straps and positioned to be located substantially on the center of the snout of a calf. U.S. Pat. No. 3,491,755 to Barghini et al. discloses an animal mask. The Barghini et al. patent includes a bulbous mask for warming air breathed by a horse from mask material supported on a frame peripherally contoured to fit snugly in the area adjacent the horse's nostrils and above the mouth.

Accordingly, there is a clearly felt need in the art for a humane weaning muzzle, which prevents a mare from nursing her foal; does not injure the mare or foal during a nursing attempt; and allows the foal to eat hay, graze off the ground and drink water.

SUMMARY OF THE INVENTION

The present invention provides a humane weaning muzzle, which prevents a mare from nursing her foal. The humane weaning muzzle includes a snout cover, a snout strap and at least two halter straps. The snout cover preferably includes a matrix of straps and cross straps attached to each other. The snout strap preferably includes a female snap connector, a male snap connector, a adjustment strap and a strap adjustment ring. The adjustment strap is attached to snout cover with sewing or any other suitable process. The female snap connector is secured to one end of the adjustment strap. The other end of the adjustment strap is inserted through a strap ring of the male snap connector. The adjustment strap and the other end of the adjustment strap are captured in the strap adjustment ring.

Each one of the at least two halter straps includes a strap material. One of a loop and hook fastener are formed on one end of the strap material. One of a hook and loop fastener are formed on substantially a middle of the strap material. The other end of the strap material is secured to the snout cover.

The humane weaning muzzle is secured to the foal in the following manner. The other end of each halter strap is inserted under a halter and secured to substantially a middle of the at least two halter straps. Each end of the adjustment strap is wrapped under the snout of the foal and the male snap connector is inserted into the female connector. The other end of the adjustment strap is pulled tight in the strap adjustment ring. The humane weaning muzzle allows the foal to eat hay, graze off the ground and drink water.

Accordingly, it is an object of the present invention to provide a humane weaning muzzle, which prevents a mare from nursing her foal.

It is a further object of the present invention to provide a humane weaning muzzle, which does not injure the mare or foal during a nursing attempt.

Finally, it is another object of the present invention to provide a humane weaning muzzle, which allows the foal to eat hay, graze off the ground and drink water.

These and additional objects, advantages, features and benefits of the present invention will become apparent from the following specification.

BRIEF DESCRIPTION OF THE DRAWINGS

FIG. 1 is a front view of a snout cover of a humane weaning muzzle in accordance with the present invention.

FIG. 2 is a cross sectional view of a stiffening material retained in the snout cover in accordance with the present invention.

DETAILED DESCRIPTION OF THE PREFERRED EMBODIMENTS

Figure 4:
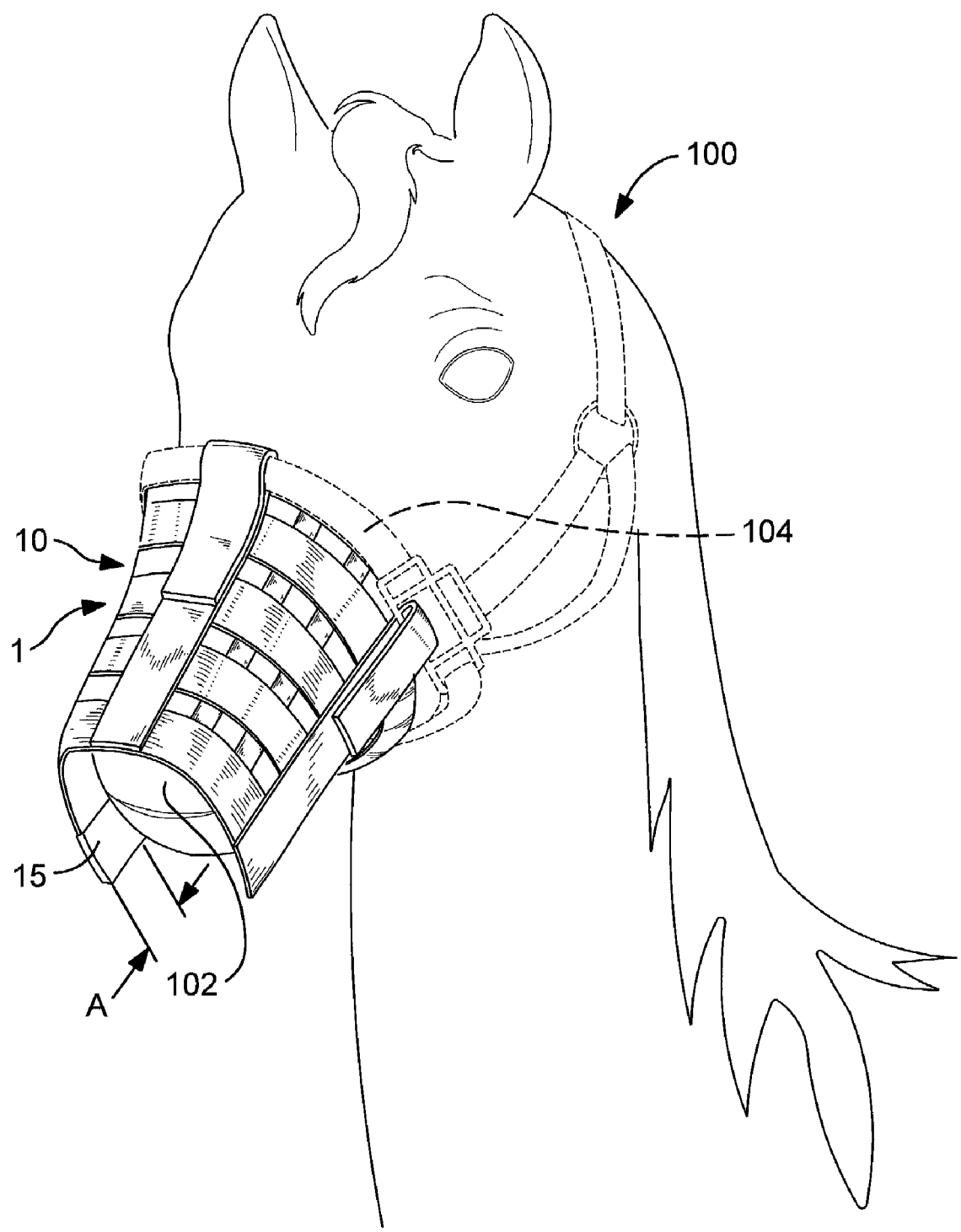
FIG. 4 is a perspective view of a humane weaning muzzle attached to a foal in accordance with the present invention.

With reference now to the drawings, and particularly to FIG. 4, there is shown a perspective view of a humane weaning muzzle 1 attached to a foal 100. With reference to FIG. 1, the humane weaning muzzle 1 includes a snout cover 10, a snout strap 12 and at least two halter straps 14a and 14b. The snout cover 10 preferably includes a matrix of straps 16 and cross straps 18, which are preferably sewn to each other, but other attachment methods may also be used. However, the snout cover 10 could also be fabricated from a single piece of material. The preferable matrix design of the snout cover 10 is more comfortable to the foal 100 with a sweating snout 102, but other designs may also be used. The snout cover 10 covers the top and preferably at least substantially all of both sides of the snout 102 of the foal 100. However, the snout cover 10 may also extend below the snout 102 on both sides. An extended area 15 of the snout cover 10 extends beyond an end of the snout 102 by a measurement "A." The following measurement is given by way of example and not by way of limitation, it is preferable to have dimension "A" be at least one inch, but other dimensions may also be used.

The snout strap 12 includes a female snap connector 20, a male snap connector 22, an adjustment strap 24 and a strap adjustment ring 26. The adjustment strap 24 is attached to the snout cover 20 with sewing or any other suitable process. The female snap connector 22 is secured to one end of the adjustment strap 24. The other end of the adjustment strap 24 is inserted through a strap ring 28 of the male snap connector 22. The adjustment strap 24 and the other end of the adjustment strap 24 are captured in the strap adjustment ring 26.

Each one of the at least two halter straps 14a,b,c include a strap material 30. One of a loop fastener 32 and hook fastener 34 are formed on one end of the strap material 30. One of the hook fastener 34 and the loop fastener 32 are formed on substantially a middle of the strap material 30. The other end of the strap material 30 is secured to the snout cover 10.

With reference to FIG. 2, a reinforcing member 36 is preferably retained between a first end halter strap 14a and one cross strap 18; a second end halter strap 14b and one cross strap 18; and two straps 16. The reinforcing member 36 is preferably fabricated from a rigid, yet bendable material, such as steel. The foal 100 must not be able to deform the extended area 15. Otherwise, the foal 100 will be able to nurse. The reinforcing member 36 is retained in at least a portion of the extended area 15.

Figure 3:
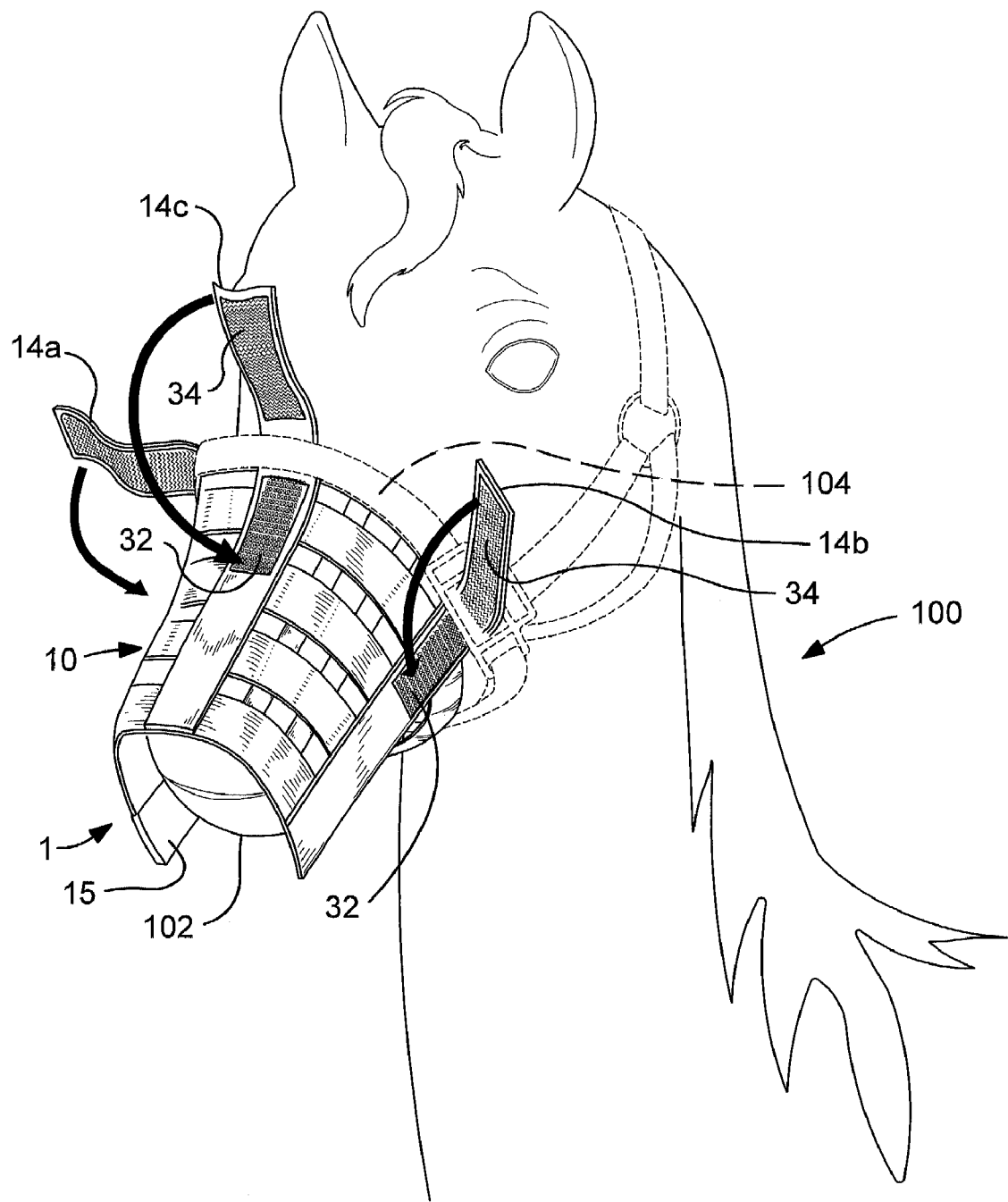
FIG. 3 is a perspective view of a humane weaning muzzle on a foal, before at least two halter straps are secured to itself in accordance with the present invention.

The humane weaning muzzle 1 is secured to the foal 100 in the following manner. With reference to FIG. 3, the one end of the at least two halter straps 14a,b,c are inserted under a halter 104 and secured to substantially a middle of the at least two halter straps 14a,b,c. Each end of the adjustment strap 12 is wrapped under the snout 102 of the foal 100 and the male snap connector 22 is inserted into the female snap connector 20. The other end of the adjustment strap 24 is pulled tight in the strap adjustment ring 26. The humane weaning muzzle 1 allows the foal 100 to eat hay, graze off the ground and drink water.

The humane weaning muzzle 1 is shown as being secured to the snout 102 of the foal 100. However, the humane weaning muzzle 1 should not be limited to horses, but may be adapted for application to cows, dogs, llamas alpacas, sheep, goats or any other animal with a snout.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A weaning muzzle for covering an animal snout comprising:
    a snout cover for covering an animal snout, said snout cover covering a top of the animal snout and at least substantially both of the sides of the animal snout, an end of said snout cover not obstructing a front portion of a mouth and nostrils of the animal, said snout cover extending at a distance beyond an end of the animal snout so as to prevent the animal from nursing from its mother; and
    a snout strap for securing said snout cover around an animal snout.

2. The weaning muzzle for covering an animal snout of claim 1, further comprising:
    said snout strap being attached to said snout cover.

3. The weaning muzzle for covering an animal snout of claim 1, further comprising:
    a portion of said snout cover extending beyond an end of the animal snout not being deformable by the animal.

4. The weaning muzzle for covering an animal snout of claim 3, further comprising:
    at least one reinforcing member being retained in said portion of said snout cover extending beyond an end of the animal snout.

5. The weaning muzzle for covering an animal snout of claim 1, further comprising:
    said snout cover including a matrix of straps and cross straps attached to each other.

6. The weaning muzzle for covering an animal snout of claim 1, further comprising:
    one end of at least two halter straps being inserted through a halter, said one end of said at least two halter straps being secured to said snout cover.

7. A weaning muzzle for covering an animal snout comprising:
    a snout cover for covering an animal snout, said snout cover covering a top of the animal snout and extending at a distance below both sides of the animal snout, an end of said snout cover not obstructing a front of a mouth and nostrils of the animal, said snout cover extending beyond an end of the animal snout so as to prevent the animal from nursing from its mother, said extended area not being deformable by the animal; and
    a snout strap for securing said snout cover around an animal snout.

8. The weaning muzzle for covering an animal snout of claim 7, further comprising:
    said snout strap being attached to said snout cover.

9. The weaning muzzle for covering an animal snout of claim 7, further comprising:
    at least one reinforcing member being retained in said portion of said snout cover extending beyond an end of the animal snout.

10. The weaning muzzle for covering an animal snout of claim 7, further comprising:
    said snout cover including a matrix of straps and cross straps attached to each other.

11. The weaning muzzle for covering an animal snout of claim 7, further comprising:
    one end of at least two halter straps being inserted through a halter, said one end of said at least two halter straps being secured to said snout cover.

12. A weaning muzzle for covering an animal snout comprising:
    a snout cover for covering an animal snout, said snout cover having an inverted U-shaped cross section when retained on a snout of the animal, said snout cover covering a top of the animal snout and at least substantially both of the sides of the animal snout, an end of said snout cover not obstructing a front portion of a mouth and nostrils of the animal, said snout cover extending at a distance beyond an end of the animal snout so as to prevent the animal from nursing from its mother, yet can graze from a field; and
    a snout strap for securing said snout cover around an animal snout.

13. The weaning muzzle for covering an animal snout of claim 12, further comprising:
    said snout strap being attached to said snout cover.

14. The weaning muzzle for covering an animal snout of claim 12, further comprising:
    a portion of said snout cover extending beyond an end of the animal snout not being deformable by the animal.

15. The weaning muzzle for covering an animal snout of claim 14, further comprising:
    at least one reinforcing member being retained in said portion of said snout cover extending beyond an end of the animal snout.

16. The weaning muzzle for covering an animal snout of claim 12, further comprising:
    said snout cover including a matrix of straps and cross straps attached to each other.

17. The weaning muzzle for covering an animal snout of claim 12, further comprising:
    one end of at least two halter straps being inserted through a halter, said one end of said at least two halter straps being secured to said snout cover.

* * * * *